United States Patent
Rock

[15] 3,679,227
[45] July 25, 1972

[54] UTILITY CART

[72] Inventor: Thomas Rock, 39 Woodland Ave., East Orange, N.J. 07204

[22] Filed: July 30, 1970

[21] Appl. No.: 59,591

[52] U.S. Cl. ........................................ 280/47.24, 280/47.33
[51] Int. Cl. .................................................................. B26b 1/12
[58] Field of Search .................... 280/47.13 R, 47.24, 47.21, 280/47.33; 296/20; 301/41 R

[56] References Cited

UNITED STATES PATENTS

| 384,402 | 6/1888 | Teal | 280/47.33 UX |
| 2,424,799 | 7/1947 | Colombo | 301/41 R |
| 938,496 | 11/1909 | Mestrovich | 296/20 |
| 2,224,087 | 12/1940 | Reichert | 296/20 |
| 3,135,346 | 6/1964 | Bertozzi | 280/47.21 X |

FOREIGN PATENTS OR APPLICATIONS 704,509  2/1941  Germany .............................. 296/20

*Primary Examiner*—Benjamin Hersh
*Assistant Examiner*—John A. Pekar
*Attorney*—Michael Ebert

[57] ABSTRACT

A utility cart of being hand-drawn over either soft or hard ground and of carrying loads of varying size and weight. The cart is composed of two distinct sections which may be dismantled when not in use to provide a more compact structure for storage or shipping purposes. The first or truck section is constituted by a frame having an axle carrying a pair of wheels, each wheel having a center tire which is flanked on either side by rollers having a paddle-wheel formation. The second section is constituted by a cradle which is supported on the truck frame, the cradle having both a handle and a rest pivoted on one end thereof.

6 Claims, 7 Drawing Figures

PATENTED JUL 25 1972 3,679,227
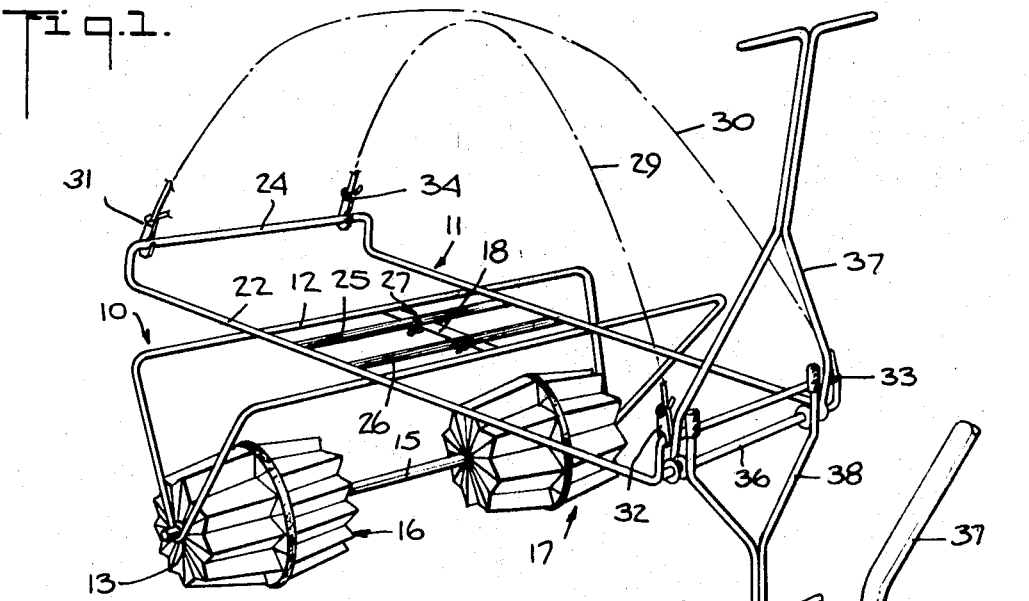
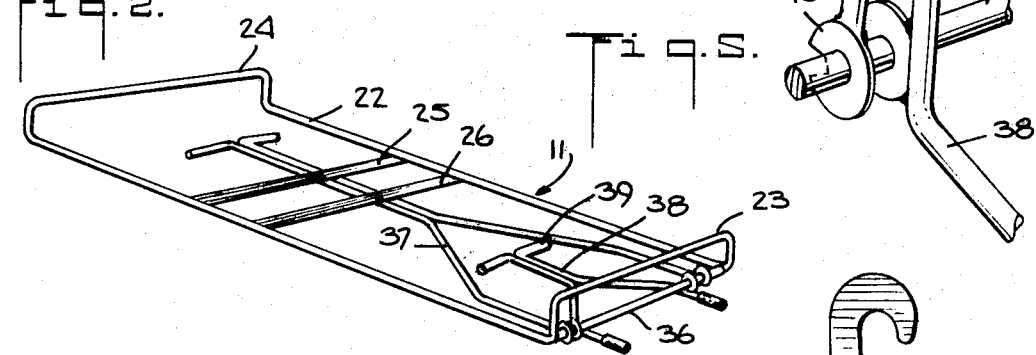
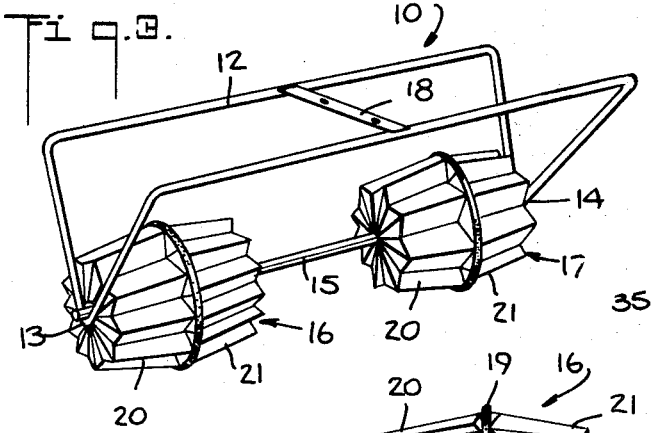
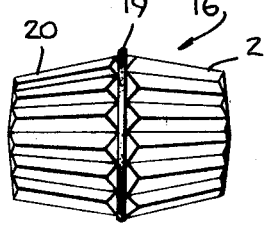
INVENTOR.
THOMAS ROCK
BY
ATTORNEY 3,679,227

UTILITY CART

BACKGROUND OF THE INVENTION

This invention relates generally to light-weight, hand-drawn carriers, and more particularly to a multipurpose utility cart adapted to ride over either soft or hard surfaces and to carry loads of varying size and weight.

Hand-drawn carts are currently available in a variety of forms for carrying small loads. Thus one can, for the purpose of carrying groceries or other articles from a store to the home, obtain a shopping cart specifically adapted to perform this function. Carts are also available for gardening, baggage-handling, and for many other purposes.

A cart designed for beach use is not suitable for most other purposes, and a cart intended to run over paved roads is not capable of going easily over sand or soft ground. The reason for this is that for sand or soft-ground operation, conventional wheels cannot be used, for they tend to sink into the ground, particularly if the load is fairly heavy. On the other hand, wheels or sleds suitable for running on sand are not usable on hard surfaces.

Moreover, conventional carts are usually provided with a basket or container dimensioned to accommodate a given load. It is not possible, therefore, with carts of standard design, to carry loads of widely varying dimensions. A further drawback of conventional hand-drawn carts is that they are fairly cumbersome and cannot be stored in a small compartment, as is sometimes necessary or desirable. For example, where the cart is intended for beach use, and is to be carried in the trunk of a car, if the cart is small enough to go into the trunk, then its load-bearing capacity is also small and often inadequate. But if the beach cart is made on a larger scale, it cannot be accommodated in the car trunk.

SUMMARY OF THE INVENTION

In view of the foregoing, it is the main object of this invention to provide a light-weight, hand-drawn cart which is capable of travelling over soft or hard surfaces.

More specifically, it is an object of this invention to provide a cart of the above type constituted by a truck section supporting a pair of wheels and a cradle section adapted to carry a variety of loads, the two sections being detachably connected whereby the cart may readily be taken apart for purposes of compact storage.

Also an object of the invention is to provide a simple, low-cost, two-wheeled cart which operates efficiently and reliably and is usable for many different purposes.

Briefly stated, these objects are accomplished in a cart having a truck section and a cradle section detachably supported thereon. The truck section is constituted by a frame having an axle carrying a pair of wheels, each of which has a center tire adapted to travel on hard ground, the tire being flanked on either side by rollers having a paddle-wheel formation adapted to travel on sand, dirt or snow. The cradle section includes end bars onto which cords or straps may be hooked to secure a load thereto, a handle and a rest being pivotally connected to one end of the cradle section.

OUTLINE OF THE DRAWING

For a better understanding of the invention, as well as other objects and further features thereof, reference is made to the following detailed description to be read in conjunction with the accompanying drawing, in which:

FIG. 1 is a perspective view of a push-pull cart in accordance with my invention;

FIG. 2 is a perspective view of the cradle section of the cart, in its collapsed state;

FIG. 3 is a perspective view of the truck section of the cart;

FIG. 4 shows one of the wheels in elevation;

FIG. 5 is detail showing the manner in which the handle and rest are pivoted to the cradle section;

FIG. 6 shows one preferred form of hook for holding the load to the cradle section; and FIG. 7 shows another preferred form of hook.

Referring now to the drawing, there is shown a hand-drawn cart in accordance with the invention, the cart being constituted by a truck section generally designated by numeral 10, and a cradle section generally designated by numeral 11.

Truck section 10 consists of a rectangular metal frame 12 whose ends are bent into a V formation, at the apex of which are secured bearings 13 and 14. Journaled in bearings 13 and 14 is an axle 15 which supports a pair of wheels 16 and 17. The sides of frame 12 are traversely bridged by a flat reinforcing strip 18.

Each wheel, such as wheel 16 shown in FIG. 4, is constituted by a center tire 19 which is flanked on either side by slightly conical rollers 20 and 21 having a paddle-wheel formation whose profile is sawtoothed, the diameter of the tire being slightly greater than the largest diameter of the rollers. Rollers 20 and 21 may be of hollow construction and molded by one or more known techniques of high-strength plastic material.

Thus when wheels 16 and 17 travel on hard ground or on a paved road, the road surface is engaged solely by tire 19 which is made of solid rubber or any other suitable composition. The tire has a circular cross-section and affords minimum contact with the hard surface, making it easy to push or pull the cart. But when the wheels ride on sand or on soft ground, the tire sinks therein, and the surface is operatively engaged by rollers 20 and 21, which, because of their relatively broad, paddle-wheel formation, make good contact with this surface without sinking therein. In this way the wheels act selectively to provide the most effective surface contact with the ground encountered thereby.

Cradle section 11 is formed by a rectangular metal frame 22 whose end portions are bent upwardly at right angles to the long sides thereof to provide bumper bars 23 and 24. Bridged transversely across the long sides of the cradle are a pair of parallel flat strips 25 and 26 which perpendicularly intersect strip 18 on the truck section and are detachably connected thereto by screw and wing nuts 27 and 28 or other means which make possible quick coupling or uncoupling of the sections.

A load supported on cradle section 12 is secured thereto by means of elastic cables or straps 29 and 30 which terminate in hooks 31 and 32, and 33 and 34. These hooks are connectable onto bumper bars 23 and 24 of the cradle. In this way, any size load within reasonable limits may be supported on the cradle and tied thereby by the elastic cable. As shown in FIG. 6, the end of cable 30 is permanently tied to hook 31.

In practice, in lieu of elastic cables, one may use a hook 34 of the type shown in FIG. 7 having a pair of spaced loops 34A and 34B through which one may pass a non-elastic line 25, the line then being knotted in the space between the loops to cause the line to tie into the hook. With a hook of this type, one may adjust the length of the non-elastic rope or cable to conform to the size of the load.

Pivotally attached to a cross bar 36 mounted below bumper bar 23 of cradle 11 is a handle 37 making it possible to push or pull the cart. When the cart is disassembled, the handle may be folded under the cradle as shown in FIG. 2. Also pivotally attached to cradle 11 at the same end is a rest 38 which includes a cross-piece 39 to engage the ground and to maintain the load on the cradle in a horizontal position when the cart is not being drawn. This rest also folds under the cradle when it is separated from the trunk section, as shown in FIG. 2. As shown in FIG. 5, handle 37 is pivoted on cross bar 36 by means of a ring 40, and rest 38 is similarly pivoted by means of ring 41.

Thus the cart, when dismantled, consists of two pieces which occupy relatively little space and which are easily stored in the trunk of a car or in any other small compartment or area.

While there has been shown and described a preferred embodiment of the utility cart of the present invention, it will be appreciated that many changes and modifications may be made therein without, however, departing from the essential spirit of the invention.

I claim:

1. A utility cart comprising:
A. a truck section including a frame supporting an axle and a pair of wheels carried on said axle, said frame being rectangular in form, the sides thereof being bent into a V formation whose apex is provided with bearings in which said axle is journaled, said wheels each having a narrow center tire flanked by relatively broad rollers, the diameter of the tire being slightly greater than that of the rollers whereby when the cart is drawn over a hard surface, only the tire engages said hard surface, whereas when the cart is drawn over a soft surface, then the tire sinks therein and the rollers engage said soft surface, and
B. a cradle section detachably connected to the truck section, said cradle section having a rectangular frame and a rest and a handle pivotally connected thereto at one end.

2. A cart as set forth in claim 1, wherein said handle and rest are arranged to fold under the frame of said cradle section when it is detached from the truck section.

3. A cart as set forth in claim 1, wherein said rollers are slightly conical and have a paddle-wheel formation.

4. A cart as set forth in claim 1, wherein said frame of the cradle section is rectangular, the end portions thereof being bent upwardly to form bumper bars onto which cables may be hooked to secure a load to the cradle.

5. A cart as set forth in claim 4, wherein said cables are elastic.

6. A cart as set forth in claim 4 wherein said cables are inelastic and are adjustably tied to hooks.

* * * * *